United States Patent [19]
Mather et al.

[11] Patent Number: 4,662,104
[45] Date of Patent: May 5, 1987

[54] METHOD AND APPARATUS FOR ADMINISTERING ACARICIDES AND INSECTICIDES TO ECTOPARASITES OF RODENTS

[76] Inventors: Thomas N. Mather, 7 Greenleaf Ave., Medford, Mass. 02155; Jose-Marcos C. Ribeiro, 270 Babcock St., Apt. 11G, Boston, Mass. 02215; Andrew Spielman, 33 Aberdeen St., Newton Highlands, Mass. 02161

[21] Appl. No.: 791,205

[22] Filed: Oct. 25, 1985

[51] Int. Cl.$^4$ ............................................... A01M 1/20
[52] U.S. Cl. ..................................... 43/132.1; 43/131; 43/124
[58] Field of Search ........................ 43/124, 131, 132.1

[56] References Cited

U.S. PATENT DOCUMENTS

| | | | |
|---|---|---|---|
| 503,268 | 8/1893 | Kelly | 43/131 |
| 1,352,067 | 9/1920 | Keyser | 43/131 |
| 1,471,954 | 10/1923 | Greenway | 43/131 |
| 1,566,199 | 12/1925 | Gaskins | 43/131 |
| 1,579,512 | 4/1926 | Bushong | 43/131 |
| 1,820,186 | 8/1931 | Gaskins | 43/131 |
| 2,063,768 | 12/1936 | Staffel | 43/131 |
| 2,340,256 | 1/1944 | Weil | 43/131 |
| 3,269,052 | 8/1966 | Barnhart | 43/131 |
| 4,941,272 | 4/1984 | Bartz | 43/131 |

FOREIGN PATENT DOCUMENTS 2096446 10/1982 United Kingdom ................. 43/131

Primary Examiner—Nicholas P. Godici
Assistant Examiner—Christopher L. McKee
Attorney, Agent, or Firm—Bromberg, Sunstein & McGregor

[57] ABSTRACT

Insecticide is administered to ectoparasites of rodents by filling a container with insecticide-impregnated fibrous nesting material and fixing it in a desired location. The container has an aperture permitting entry by rodents. Rodents incorporate the insecticide-impregnated fibrous material into their nests, thus exposing ectoparasites and their nymphs and larvae attached to these hosts, as well as those otherwise dwelling in the rodent's nest, to the insecticide.

4 Claims, 5 Drawing Figures

METHOD AND APPARATUS FOR ADMINISTERING ACARICIDES AND INSECTICIDES TO ECTOPARASITES OF RODENTS

DESCRIPTION

Technical Field

The present invention relates to the administering of acaricides and insecticides, and in particular to administering these chemicals to ectoparasites of rodents.

BACKGROUND OF THE INVENTION

Controlling ectoparasite infestations on naturally occurring small mammal hosts may be an efficient means of protecting humans from several important health threats. Many arthropod species, including a variety of ticks, serve to transmit disease from their natural hosts to man.

Present methods for managing infestations of disease-transmitting ticks to protect the public health are few and suffer from various drawbacks. For example, acaricidal treatment of vegetation is impractical because of the quantity of environmentally objectionable chemicals required and the extent of the region to be treated. Despite this drawback, commercial pest control applicators have attempted such treatment locally to control ticks and fleas, but without any reported success. In special situations, burning of vegetation or other environmental modification may hold some promise, but further evaluation is required before this can be considered a practical alternative. Individual residents of affected regions may gain some personal protection by using tick or other insect repellents (Schreck et al., 1982b) but this measure requires discipline, and the necessary materials are not generally available.

Because of the difficulty in attacking ectoparasitic arthropods directly, present efforts, as for example is the case with a group of related tick species, are focused on reducing the abundance of mammal species, particularly deer, serving as hosts for the reproductive stage ticks. This measure is controversial because of the potential ecological impact of such a program. Efforts to reduce the abundance of rodents, another mammalian host, seem counterproductive. Apparently, reducing the abundance of rodents, even if it were practical, may serve to increase the density of ticks relative to these hosts, which in turn would increase the risk of human infection (Spielman et al., 1981)

Insecticides for control of ectoparasites and other hematophagous arthropods have been applied directly to small native rodents.

There is recorded in the literature a method for attacking sandflies by distributing small pieces of cloth impregnated with insecticide near the burrows of desert rodents; rodents take the pieces of cloth into their burrows, and thus kill the sandflies. However, this approach requires precise knowledge of the location of the burrows, and this is impracticable under actual field conditions. Wild rodent hosts of fleas have been treated using the "bait box" technique (Kartman, 1958, 1960). In this treatment, rodents were attracted to baited containers where they dusted themselves with pesticide-impregnated powder. Modifications of the bait box technique have recently been described, extending treatment to tick-infested rodents (Sonenshine and Haines, Sept. 20, 1985). Thus, such treatment provides for immediate reduction of the arthropod infestation, but continuous self-treatment by rodents is necessary to destroy all vectors which would feed on a host in its lifetime.

Health threats transmitted by ectoparasites of rodents include Lyme disease and babesiosis (both transmitted by Ixodes ticks), Rocky Mountain spotted fever (transmitted by Dermacentor ticks), scrub typhus (also called tsutsugamushi disease) (transmitted by chiggers, especially in Asia but also in Africa), murine typhus and plague (both transmitted by fleas), and rickettsial pox (transmitted by gamasid mites).

In order to illustrate the types of problems posed in dealing with diseases of the foregoing nature, Lyme disease, the most common form of tick-borne disease in the United States, is discussed in detail.

Lyme disease is a complex multisystem disorder involving neurological or cardiac abnormalities as well as intermittent attacks of arthritis. If untreated, the disease can become severe: arthritis can become chronic, with erosion of bone and cartilage. Treatment in the later stages of the disease is not always successful and involves costly hospitalization. Early treatment of Lyme disease with antibiotic therapy generally is successful (Steere, 1983b); however, disease symptoms even in endemic regions often go unrecognized or misdiagnosed. Regardless of the antibiotic therapy given, patients still may experience minor late complications, such as recurrent episodes of pain in joints, bursae or tendons (steere et al., 1983b). More serious tertiary manifestations of Lyme disease, involving delayed neurological effects (similiar to those of tertiary syphillis) have recently been reported. In the decade since its discovery, Lyme disease has presented a growing and significant threat to the public health.

Throughout most of the regions affected by Lyme disease, the vector is a recently described deer tick, *Ixodes dammini* (Spielman et al., 1979; Wallis, 1978). The causal agent is a spirochete (Burgdorfer et al., 1982), recently designated *Borrelia burgdorferi* (Johnson, et al., 1984). White-footed mice (*Peromyscus leucopus*) appear to be the effective reservoir hosts (Levine et al., 1985) since mice remain infective for long periods of time (Donahue, unpublished), and most immature *I. dammini* feed on these animals (Piesman and Spielman, 1979). Zoonotic transmission of *B. burgdorferi* requires that larvae acquire the pathogen in an infective blood meal, and derived nymphs transmit the infection back to mice. Human infection usually results from the bit of an infected nymph.

Lyme disease apparently is spreading geographically and increasing in incidence. The number of cases reported to the Center for Disease Control (CDC) has increased over the past two years. Lyme disease is now the most commonly reported tick-borne illness in the United States (Anon, 1985). Nearly 1,500 documented infections were recorded by the CDC during 1984 from 21 states. Of course, undiagnosed, incompletely documented and unreported cases should greatly outnumber these reported cases. Further, additional seemingly inapparent infections occur. For example, 40 percent of residents ages 8–82 in one Massachusetts summer community were sero-positive for Lyme disease, yet only 25 percent of infected individuals reported acute clinical symptoms (unpublished). Interestingly, nearly 30 percent of these residents indicated having intermittent arthritic attacks or other later manifestations of Lyme disease. Given the possibility of tertiary effects from even these inapparent infections, this disease is a serious matter.

DISCLOSURE OF INVENTION

The present invention focuses control on infected ectoparasites rather than on the mammalian hosts by providing an apparatus and associated method that takes advantage of the natural nesting behavior of rodent hosts to administer insecticide more selectively, thus reducing the environmental impact of earlier methods and increasing the effectiveness of the treatment.

The present invention provides a method and apparatus in which insecticide-impregnated rodent nesting material is placed in a holder. The term "insecticide" as used in the preceding sentence and in this description and in the claims below means any chemical that is active against an arthropod (including, for example, a chemical active against a tick). Rodents incorporate the material into their nests, thus bringing the insecticide into contact with ectoparasites carried by rodent hosts.

BRIEF DESCRIPTION OF THE DRAWINGS

These and other features of the invention will be more readily understood by consideration of the following detailed description taken with the accompanying drawings, in which.

DESCRIPTION OF SPECIFIC EMBODIMENTS

Figure 1:
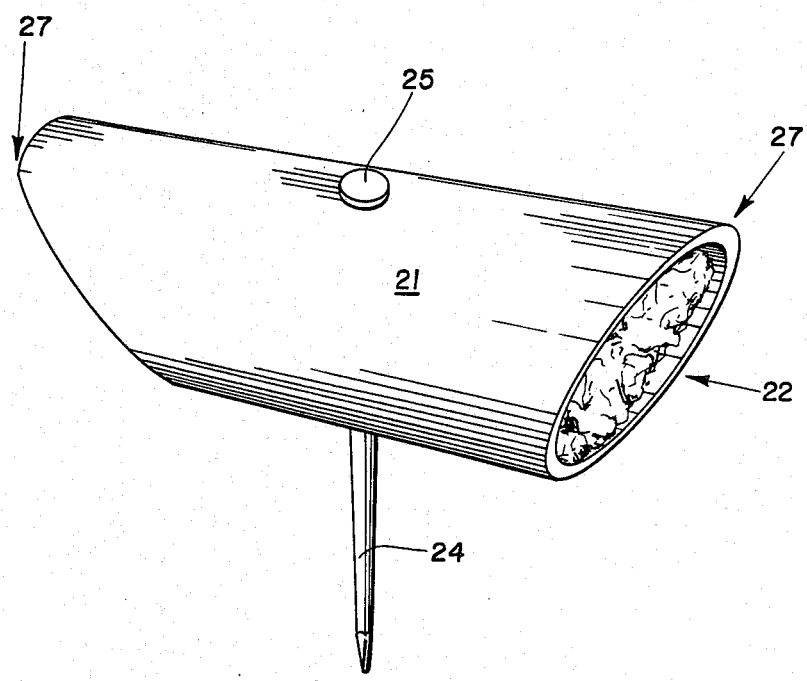
FIG. 1 shows a perspective view of a preferred embodiment of an apparatus according to the invention.
Figure 2:
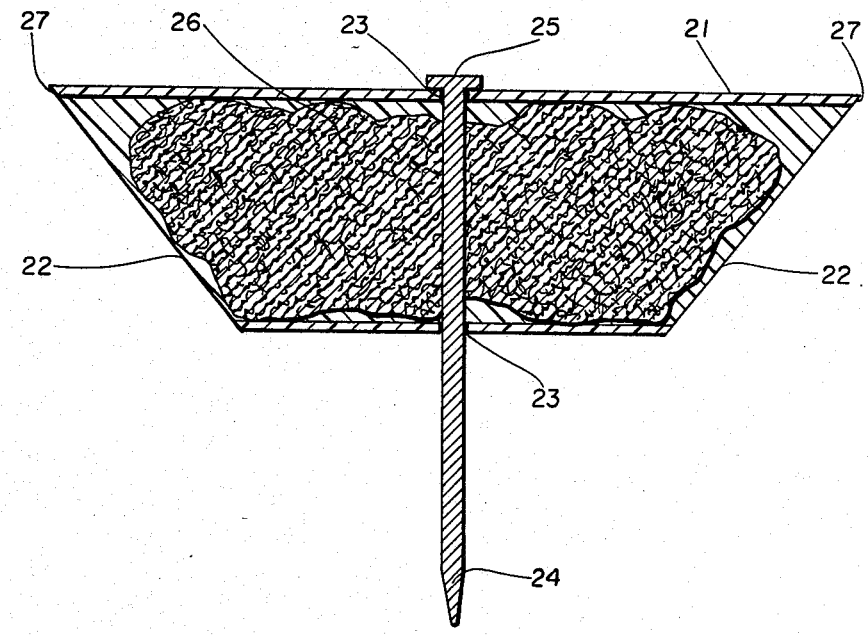
FIG. 2 shows a longitudinal section of the embodiment of FIG. 1.

FIG. 1 shows a perspective view and FIG. 2 shows a longitudinal section of a preferred embodiment of an apparatus according to the present invention. As can be seen in these figures, this embodiment includes a tubular body 21 with a substantially trapezoidal longitudinal section. The particular shape of the body was chosen for its ease of manufacture and because the openings 22 in the body combine ready access to its contents with a high degree of protection of the contents from the elements afforded by overhanging portions 27 of the tube. Other shapes for the body are possible.

This particular embodiment of the invention also shows a fastening member 24, which passes through apertures 23 in the body, into the desired surface, such as the ground or other substrate. A retaining head 25 serves to prevent the fastening member from passing entirely through the apertures 23. Although not shown in the drawings, it would be possible to introduce a shim element between the body and the desired surface if a certain amount of clearance therebetween were desired. Alternatively, the lower region of the fastening member may be provided with a retaining washer or nut mounted at a fixed location so as to prevent the tubular body from downward travel along the member, in the event that the member is inserted, for example, in the ground in such fashion that the body is somewhat elevated therefrom.

The material 26 contained in the body is a fibrous material, suitable for rodent nesting. Because of its high absorbency, ready availability, low cost, and attractiveness to rodents as nesting material, cotton is a preferred fibrous material.

Before it is loaded into the body, the fibrous material 26 is impregnated with an insecticide. The chemical permethrin, which is commercially available, for example, under the tradename Permanone, is well suited for the insecticide in this invention. This environmentally "safe" chemical has been developed as a tick repellent suitable for impregnation into clothing (Schreck et al., 1978, 1980a). Subsequent studies (Schreck et al., 1982b, 1985; Lane and Anderson, 1984) have further described the repellent and toxic nature of permethrin impregnated in clothing to ticks, including species related to *I. dammini*. Measures of wear and wash persistence of permethrin in impregnated cloth have shown that such treated material is toxic to ticks after 30 days of wear and up to three normal laundry cycles (Schreck et al., 1980a, 1982a). This persistence of activity in impregnated material in addition to permethrin's known photostability (information provided by the manufacturer) makes permethrin particularly suitable for use in the invenition. Preliminary studies have shown that all ticks are killed on mice exposed in the laboratory to permethrin-treated cotton (PTC), even when the cotton was exposed to natural conditions for two months (unpublished). It may be that PTC further impregnates the fur coat of exposed mice, thereby providing additional tick-killing action. Thus, treatment of tick-infested areas with PTC may be a powerful and specific method of reducing vector tick abundance.

Although the above description of the embodiment depicted in FIGS. 1 and 2 discloses impregnating only the nesting material with insecticide, it would be possible to impregnate the container with insecticide as well. Physical contact between a rodent and an insecticide-impregnated container would expose ectoparasites embedded in the rodent's coat to the insecticide.

In a preferred embodiment of an apparatus according to the invention, the tubular bodies are 0.2 m PVC pipe containing approximately 10 grams of cotton. The cotton is impregnated with 50 g/AI permethrin per kg of cotton. Other container materials may be desirable; for example, a wax-coated cardboard structure may be substituted for the PVC pipe. Preferably, the container should be sufficiently durable to resist weather and attack by rodents, yet it should also be biodegradable.

Figure 3:
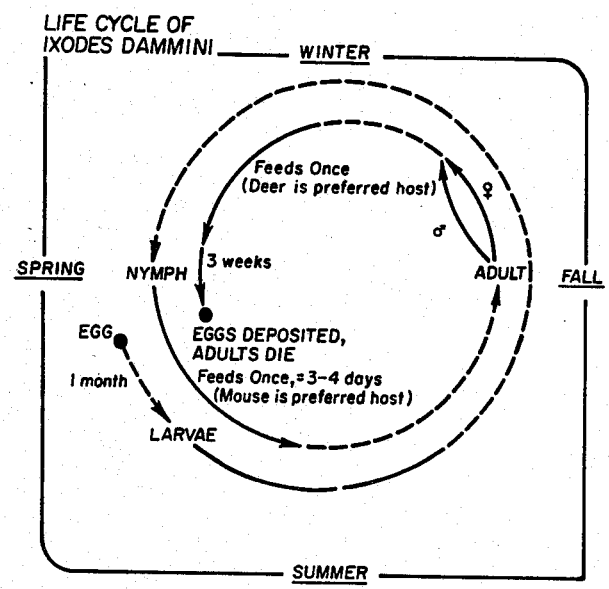
FIG. 3 shows the life cycle of the *Ixodes dammini* (deer tick)

FIG. 3 shows the observed life cycle of the tick *I. dammini*. Based in part on this cycle, the invention provides a method for administering insecticides to ticks carried by rodents. We have found that engorged, immature *I. dammini* detach from their rodent hosts in a synchronous, diurnal pattern (Mather and Spielman, 1986). In laboratory experiments, most engorged larvae and nymphs detached from mouse and hamster hosts during daylight hours, a period of inactivity for these animals. This interesting behavior provides a unique window of vulnerability in which to focus control efforts. A method of exposing mouse burrows to insecticides would result in reduced tick abundance, and if the chemical persisted, the burrow would then act as a trap, "collecting" and killing vector ticks.

Figure 4:
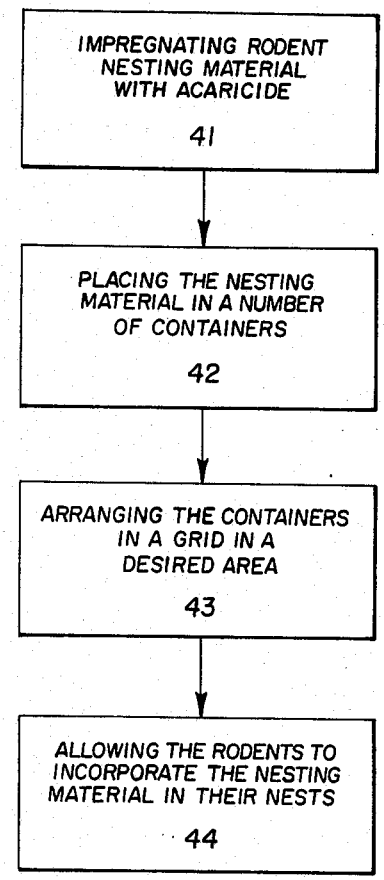
FIG. 4 shows a preferred embodiment of a method according to the invention.
Figure 5:
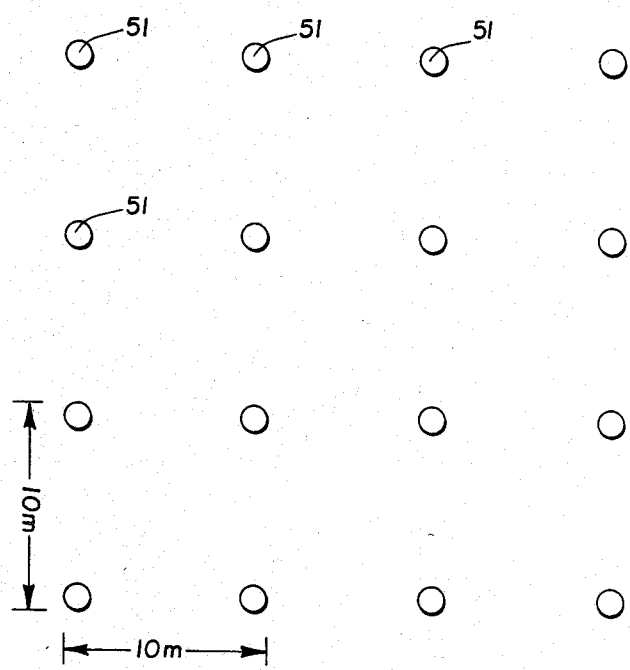
FIG. 5 shows a grid that relates to the method shown in FIG. 4.

FIG. 4 shows a preferred embodiment of a method according to the present invention, and FIG. 5 shows an array comprising part of the embodiment shown in FIG. 4. In this embodiment, permethrin treated cotton (step 41) is placed (step 42) in open containers and arranged (step 43) roughly 10 m apart in the array shown in FIG. 5, in which each container is shown as item 51.

Around residences, lines of containers would be placed at 10 m intervals in suitable mouse habitat on the perimeter of the residential sites. The cylinders need not be placed merely on or near the ground, but may also be placed in any location proximate to where rodents may be suspected to roam. The remaining step (step 44) is merely to permit the rodents to incorporate the nesting material in their nests.

The nesting behavior of *P. leucopus* is key to the success of this method. Fortunately, in the course of foraging, mice actively seek and transport appropriate nesting materials, including cotton batting, to their burrows. The region in which a mouse conducts thes activities is known in the art as the mouse's "home range." In one study, much of the cotton placed in artificial nesting boxes was removed to the natural nests of mice (Nicholson, 1941). In a preliminary study, it was found that 12 percent of cotton placed in wooded areas was removed each night, presumably to the nests of mice (unpublished). Once in the nest, mice would become more fully exposed to the impregnated permethrin as nest construction includes such behaviors as boring into the pile of nesting material, combing the material to the sides, and molding a nest cup by turning movements of the body (Eisenberg, 1968). Thus, this method capitalizes on the behavior of both host and vector which, in turn, increases the specificity of the desired response.

Although the above discussion is directed towards ticks transmitting Lyme disease and babesiosis, the spread of other diseases transmitted by various vectors could also be controlled by the disclosed technology. These include the chigger vectors of scrub typhus, the fleas that transmit plague and murine typhus, and the gamasid mites that trasmit rickettsial pox.

What is claimed is:

1. A method for administering insecticide to ectoparasites of rodents, comprising the following steps:
    (a) impregnating rodent nesting material with an insecticide;
    (b) placing the nesting material in a number of containers;
    (c) arranging the containers in an array in a desired area, configuring the array based on knowledge of the foraging patterns of rodents; and
    (d) allowing rodents to incorporate the nesting material into their nests.

2. A method for the prevention of Lyme disease, comprising the following steps:
    (a) impregnating rodent nesting material with an insecticide;
    (b) placing the nesting material in a number of containers;
    (c) arranging the containers in an array in a desired area, configuring the array based on knowledge of the foraging patterns of rodents; and
    (d) allowing rodents to incorporate the nesting material into their nests.

3. A method according to claim 2, wherein step (c) includes the step of arranging the containers so that adjacent containers are spaced approximately 10 meters from one another.

4. A method according to claim 2, wherein step (c) includes the step of spacing the containers such that there is at least one container within the home range of each rodent within the desired area.

* * * * *